United States Patent [19]

Snead

[11] 4,390,075
[45] Jun. 28, 1983

[54] LOAD WEIGHING AND ACCUMULATING SYSTEM AND METHOD

[76] Inventor: Edwin deS. Snead, Box 798, Georgetown, Tex. 78626

[21] Appl. No.: 200,327

[22] Filed: Oct. 24, 1980

Related U.S. Application Data

[60] Division of Ser. No. 945,075, Sep. 22, 1978, Pat. No. 4,230,196, which is a continuation of Ser. No. 841,383, Oct. 12, 1977, abandoned.

[51] Int. Cl.³ .............................................. G01G 3/14
[52] U.S. Cl. ................................. 177/210 FP; 177/1; 177/DIG. 3
[58] Field of Search ..................... 177/210 FP, 211, 1, 177/DIG. 3

[56] References Cited

U.S. PATENT DOCUMENTS

| 3,662,845 | 5/1972 | Pratt | 177/DIG. 3 |
| 3,984,667 | 10/1976 | Loshbough | 177/DIG. 3 |
| 4,044,846 | 8/1977 | Matilainen | 177/DIG. 3 |
| 4,139,069 | 2/1979 | Domis et al. | 177/210 FP X |

*Primary Examiner*—George H. Miller, Jr.
*Attorney, Agent, or Firm*—Peter J. Murphy

[57] ABSTRACT

A loader includes a lift arm assembly, raised by hydraulic lift cylinders and carrying a load bucket. Alignment members mounted respectively on the loader frame and lift arm assembly, and visible to the loader operator, identify the weigh position of the lift arm assembly. A pressure to voltage transducer is mounted on one lift cylinder, and is connected in a bridge circuit producing a DC voltage output. The bridge circuit output signal, proportional to the bucket load, is fed to an amplifier, whose output is passed to an analog-to-frequency converter producing pulses at a frequency proportional to the bucket load. An electronic clock allows the converter output pulses to pass through an AND gate to a bucket counter which displays the bucket load, and is automatically reset to zero. The converter pulses are passed to an accumulator counter through a second AND gate. The accumulator counter accumulates the weight of several bucket loads which are loaded onto a transport vehicle; and is reset manually after the vehicle is loaded.

The method includes the steps: detecting the instantaneous pressure in the hydraulic lift cylinder; converting that instantaneous pressure into an electric analog signal proportional to the instantaneous pressure; adjusting that analog signal to eliminate the component which represents the weight of the empty bucket; amplifying the adjusted analog signal; converting the adjusted analog signal to a frequency signal comprising pulses generated at a frequency proportional to the adjusted analog signal; and passing the frequency signal to a pulse counter, through controlled gate means for counting and displaying pulses representing the instantaneous bucket load. The same pulses are passed to a second counter through the same control gate and through an additional control gate to accumulate pulses representative of successive bucket loads.

12 Claims, 4 Drawing Figures

LOAD WEIGHING AND ACCUMULATING SYSTEM AND METHOD

This is a divisional application of application Ser. No. 945,075, filed Sept. 22, 1978, now U.S. Pat. No. 4,230,196 which is a continuation of Ser. No. 841,383, filed on Oct. 12, 1977, abandoned.

BACKGROUND AND SUMMARY OF THE INVENTION

This invention relates to a a weighing system for weighing each load handled by a load handling apparatus and for accumulating the total weight of the material transferred; and to a method for weighing bulk material during such handling by a load handling apparatus.

This invention is concerned with the use of loading machines, commonly referred to as front end loaders, for the loading of bulk material such as gravel from ground stock piles onto transport vehicles such as railroad cars or trucks. It is important that these vehicles be loaded to maximum legal capacity for a number of reasons. In the case of railroad cars, when the cars are underloaded, such underloading simply represents loss of gross sales when railroad cars are in short supply because the shipper is simply not utilizing the shipping capacity which is available. If a car is overloaded, and this is not discovered until the car is weighed in the railroad yard, the cost of reducing the load is very expensive in terms of man hours and equipment; and, in addition, the material unloaded is either lost or can only be marketed at greatly reduced value.

In the case of transport trucks, the penalty for underloading is the same as that for railroad cars; and the penalty for overloading includes fines and possible loss of material which must be unloaded. It is important then that means be provided for loading vehicles accurately so that they can be loaded near legal capacity with minimum risk of overloading.

While experienced loader operators may be able to estimate very closely the loads which are being loaded onto a transport truck or railroad car, this is only possible where the loader operator is able to visually observe the load in the bucket, and has the experience to estimate the weight of the particular material which is being loaded. It is a fact, however, that for many large capacity loaders, the load in the bucket is not visible to the operator; and it is necessary therefore to provide some form of automatic system for weighing each bucket load and, preferably, to accumulate the weights of the several bucket loads which are loaded onto the transport vehicle.

A principal object of this invention is to provide a weighing system and method for use with hydraulic loading apparatus, to enable the loading of a transport vehicle to maximum capacity without overload.

Another object of this invention is to provide a system and method for the precision weighing of bulk materials loaded from a stockpile onto a transport vehicle, while the material is being loaded.

A further object of this invention is to provide a system and method for the precision weighing of each bucket load transferred to another location.

Still another object of this invention is to provide a hydraulic loader having a self-contained system for weighing each bucket load, and for accumulating the weight of a series of bucket loads which are transferred to another location.

A still further object of this invention is to provide a weighing system and method for a hydraulic loader, for weighing bulk material loaded onto a transport vehicle efficiently with minimum loss of operator time.

These objects are accomplished in a system for measuring and indicating the weight of a load. A transducer is operatively connected to a load supporting apparatus for producing an instantaneous electric analog signal proportional to the supported weight. A converter converts that analog signal to a frequency signal consisting of pulses generated at a frequency proportional to the analog signal. A gate is controlled by a clock which provides periodic gate open intervals of preselected uniform time and passes the frequency signal to a counter for counting and displaying the pulses which are representative of the supported load. An actuator coupled to the gate enables initiating single gate open intervals for each load, so that the counter may function as an accumulator counter. More particularly the system may include a second counter which continuously displays the weight of the instant supported load, the first mentioned counter and actuator means functioning to accumulate the weight for successive loads handled by the load supporting apparatus.

These objects are accomplished in a method which includes the steps: detecting a load by means of a transducer connected to a load supporting apparatus and producing an electric analog output signal; converting that analog signal to a frequency signal consisting of pulses generated at a frequency proportional to the analog signal; generating that frequency signal as a continuous signal; counting pulses of the frequency signal during a preselected time period, to represent a supported load; storing the counted pulses in an accumulator counter, to accumulate the weights of successive supported loads. More particularly the method includes the steps: passing the pulses of the frequency signal to an automatically resettable unit counter which continuously displays the weight of the instant load; and passing the pulses to the accumulator counter during only one time interval for each successive supported load.

The novel features and the advantages of the invention as well as additional objects thereof, will be understood more fully from the following description when read in connection read in connection with the accompanying drawings.

DRAWINGS

DESCRIPTION OF THE PREFERRED EMBODIMENT

Figure 1:
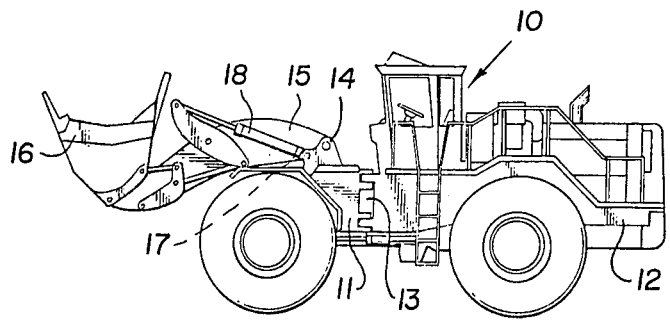
FIG. 1 is a side elevation of a hydraulic front end loader of a type embodying the present invention.

FIG. 1 of the drawing is an elevation view of a typical articulated front end loader having a front frame 11 and a rear frame 12 connected by a hinge joint 13. The front frame carrier a lift arm assembly which includes a pair of generally parallel lift arms 15, with the rearward end of the arms pivotally attached to the frame at supporting ears 14; and a load bucket 16 is pivotally attached to the arms 15 at the forward ends. The arms are raised and lowered by hydraulic lift cylinders 17, not visible in the drawing. The bucket 16 is pivoted, between the illustrated rear limit position, and a dump position by means of one or more dump cylinders 18. The rear frame 10 carries the loader engine and operator cab.

Figure 2:
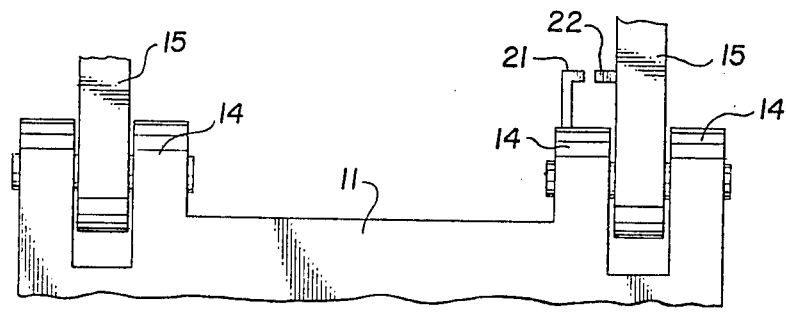
FIG. 2 is a detail view of position indicator means for the lift arms as viewed from the operator cab.

In connection with the accuracy of weighing the load in the bucket, the bucket should be in a standard "weigh position" when the load weight is observed and recorded. For reasonable accuracy, the standard weigh position includes (1) a selected elevated position of the lift arm assembly relative to the loader frame and (2) a selected rotational position of the bucket relative to the lift arm assembly. The selected rotational position of the bucket may be the rearward limit of rotation wherein the dump cylinders are fully retracted as indicated in FIG. 1. For the purpose of identifying the weigh position of the lift arm assembly, a pair of alignment markers or pointers 21 and 22 having horizontally confronting portions are mounted respectively on a frame ear 14 and on one arm of the lift assembly 15, as best seen in FIG. 2. These markers are positioned to be readily visible to the loader operator, to enable momentary stopping of the load when the markers are aligned. In FIG. 2, the arms 15 are shown in the "weigh position" with the markers 21 and 22 aligned, as viewed from the operator cab.

With such structure for fixing very accurately the height of the bucket in relation to the frame of the loader, a very high loading accuracy of less than 2% error is readily obtained. The applicant has discovered that high loading accuracy is obtainable even when the loader is operated over unlevel or uneven ground.

The weighing system to be described is based on the fact that the pressure of the hydraulic fluid in the lift cylinders will vary in proportion to the changes in weight of the bucket 16 and lift arm assembly including bucket load. Therefore, with suitable compensation for the weight of the lift arm assembly and the unloaded bucket and with suitable calibration, this variation in hydraulic pressure is utilized as a direct indicator of the actual weight of bulk material in the bucket.

Figure 3:
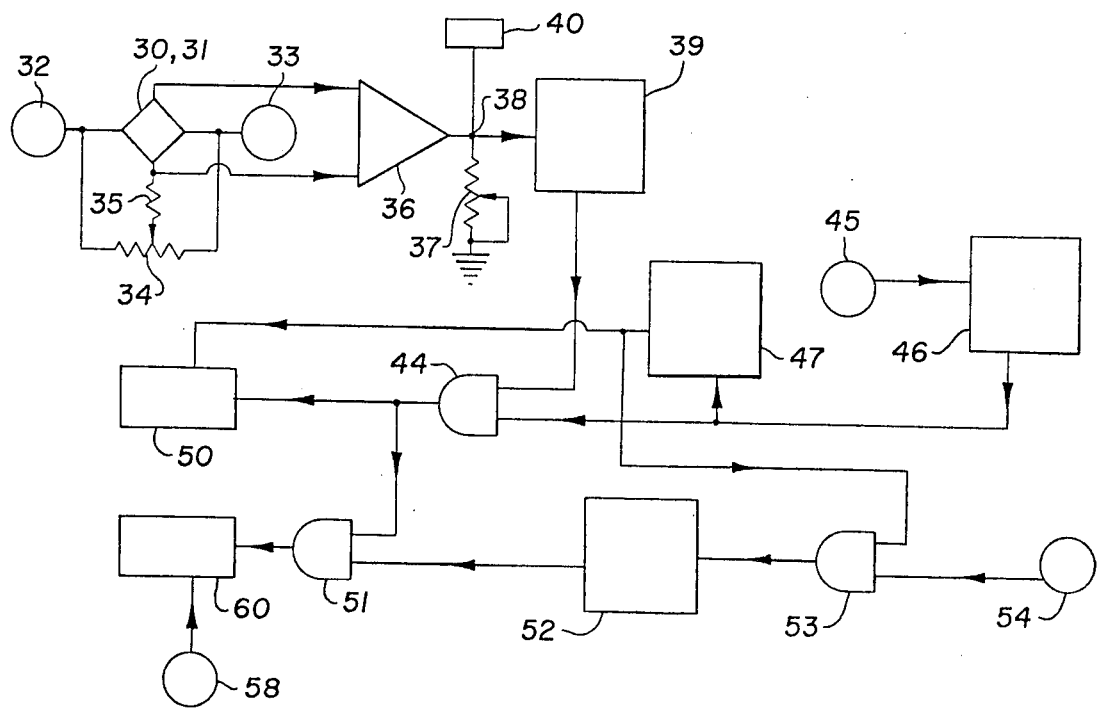
FIG. 3 is a block diagrammed circuit arrangement for the weight measuring and accumulating system.

A preferred circuit arrangement for the weighing and weight accumulating system is illustrated diagrammatically in block form in FIG. 3 of the drawing. This system includes a pressure-to-voltage transducer, a hydraulic pressure gauge 30 mounted on the lift cylinders 17 and having incorporated therein strain gauges which, when excited, product a voltage signal proportional to the pressure extent in the cylinder. The strain gauges are connected in Wheatstone bridge circuit 31 which is excited by DC voltage from regulated voltage power supplies 32 and 33. The bridge circuit 31 is also connected to a tare adjustment circuit consisting of a tare potentiometer 34 and a resistor 35. This adjustment is provided to unbalance the bridge to provide for zero bridge output when the arms and unloaded bucket are placed in the standard "weigh position", so that the bridge output will reflect in operation, only the weight of the load in the bucket. The bridge output is fed to a constant current amplifier 36, the output of which is a current proportional to the load in the bucket 16. The amplifier output current is passed through a calibration potentiometer 37, thereby producing an output voltage signal at the point 38 which is fed to an integrator 39. The potentiometer 37 functions as a calibration adjustment for the system.

A voltmeter 40 may be connected at the point 38, and may be calibrated to indicate the instantaneous bucket load.

The integrator 39 is an analog-to-frequency converter which converts the input voltage to a series of pulses at a frequency which is proportional to the input voltage and therefore to the weight of the load in the bucket 16. The integrator output is fed to an AND gate 44.

A crystal oscillator 45 and a frequency divider 46 provide an accurate clock providing output clock pulses of ½ second duration which are initiated at clock intervals of one second. The clock output is fed to the AND gate 44, and to a one-shot 47.

The output of the AND gate 44 is connected to a bucket counter 50 and also to one input of an AND gate 51, the output of which is coupled to an accumulator counter 60. Both the bucket counter 50 and the accumulator counter 60 are preferably digital readout counters. The bucket counter 50 is an automatic reset counter controlled by the one shot 47, the output of which is coupled to the bucket counter. Triggered by the clock pulse from clock 45, 46 the one shot 47 produces a 0.001 second pulse, simultaneously with the beginning of the clock pulse, which resets the bucket counter to zero. The clock pulse opens AND gate 44 allowing passage of pulses from the integrator 39 to the counter 50 for the ½ second duration of the clock pulse; and the counter 50 then displays the bucket load for the following ½ second of the clock interval. This counting of a significant number of pulses for a time period of ½ second is important to the accuracy of the system. By way of example, a bucket load may range from 5000 lbs. to 40,000 lbs. and the corresponding pulses counted for these loads may range from 50 to 400 pulses. The transducer output may fluctuate due to vibration, for example, and the counting of pulses for a significant time period will average the fluctuations and reduce possible resultant error. For calibration of the system, a premeasured load is placed in the bucket 16 and the calibration resistor 37 is adjusted so that the counter 50 reading corresponds to the premeasured bucket load. During each clock interval, the bucket counter 50 is first reset to zero, then counts the bucket load count during the following ½ second, and then displays the bucket load during the next following ½ second.

The output from the AND gate 44 is fed to the accumulator counter 60 as determined by the circuit consisting of the AND gate 51, a one-shot 52, an AND gate 53, and an add switch 54. The one shot 52 is coupled to the ouptut of the AND gate 53, and produces a 0.75 second accumulator pulse which commences with the beginning of a clock pulse only when the add switch 54 is closed, to produce simultaneous inputs from the add switch and one-shot 47 to the AND gate 53. When this occurs the accumulator pulse of the one shot 52 commences simultaneously with the opening of the AND gate 44; and therefore the AND gate 51 is also opened simultaneously to pass the output pulses from the converter 39 to the accumulator counter 60. The accumulator counter 60 then counts the same pulses which are counted by the bucket counter 50 during that particular clock pulse. The add switch 54 is only closed once for each bucket load. Accordingly, the accumulator counter 60 will accumulate the count of successive bucket loads until such time as this counter is reset to zero; and this occurs only when the reset switch 58 is closed. For the loading of a railroad car for example, the reset switch 58 is closed to reset the accumulator counter 60 prior to picking up the first bucket load; and is not closed again until the car is fully loaded as indicated by the accumulator counter display after the last bucket load is dumped.

Preferably all of the above described components of the weighing and accumulating circuit are contained in a housing having a control panel on one face, and which is mountable conveniently in the operator cab of the loader 10. This control panel would include windows for visual readout of the bucket counter 50 and accumulator counter 60, and would support the tare potentiometer knob 34, the calibration potentiometer knob 37, the add switch 54, the reset switch 58, and an on-off switch.

OPERATION

To calibrate the system, the lift arms 15 and bucket 16 are positioned in the weigh position with the bucket empty. The tare potentiometer 34 is then adjusted to produce zero bridge output and therefore zero input to the amplifier 36; and this will be indicated by zero readings at the bucket counter 50 and on the voltmeter 40.

Next a premeasured load is placed in the bucket 16 which is again elevated and positioned in the weigh position. The calibration potentiometer 37 is then adjusted until the reading of the bucket counter indicates the premeasured load in the bucket. The system is then calibrated for the particular loader on which it is mounted.

For loading a transport vehicle which requires more than one bucket load, the operator proceeds to dig into the stockpile for example to load the bucket, then while moving the loader to the transport vehicle he raises the lift arms 15 to the weigh position while simultaneously tilting the bucket to the weigh position which is the full back or normal position of a loaded bucket. During this time the bucket counter 50 is displaying the bucket load repetitively (i.e. once each second). With the lift arms and bucket stopped in the weigh position, the operator closes the add switch 54 which causes the load count to be fed to the accumulator counter 60.

With a little experience and with the use of the bucket counter, the operator soon knows when he has the maximum bucket load; and this is useful only in connection with utilizing his time and equipment most efficiently in transferring the material from the stockpile to the transport vehicle.

The operator will continue to dump the bucket loads into the transport vehicle until the load approaches the desired load.

With each bucket load entered in the accumulator counter 60, the accumulator will reflect the total material then loaded. The operator will know then that he needs a partial bucket load (five tons for example) to complete the loading. For this last bucket load then he will use his experience and the bucket counter 50 to load the bucket to 5 tons, and will then place the arms and bucket in the weigh position. If the bucket load is slightly heavy as indicated by the bucket counter, he will dump some of the material; and if the load is slightly light, he will need to pick up additional material. After again checking the bucket load at the weigh position he will enter the final bucket load in the accumulator counter 60, and complete the loading of the transport vehicle.

Preferably the load weight, then displayed in the counter 60, will then be recorded onto suitable forms for later comparison with an actual weighing of the transport vehicle.

Where the loader is simply used to transfer any amount less than a full bucket load, the bucket counter 50 is used in the same manner as described above for the last bucket load.

MODIFIED CONTROL CIRCUIT—FIG. 4

Figure 4:
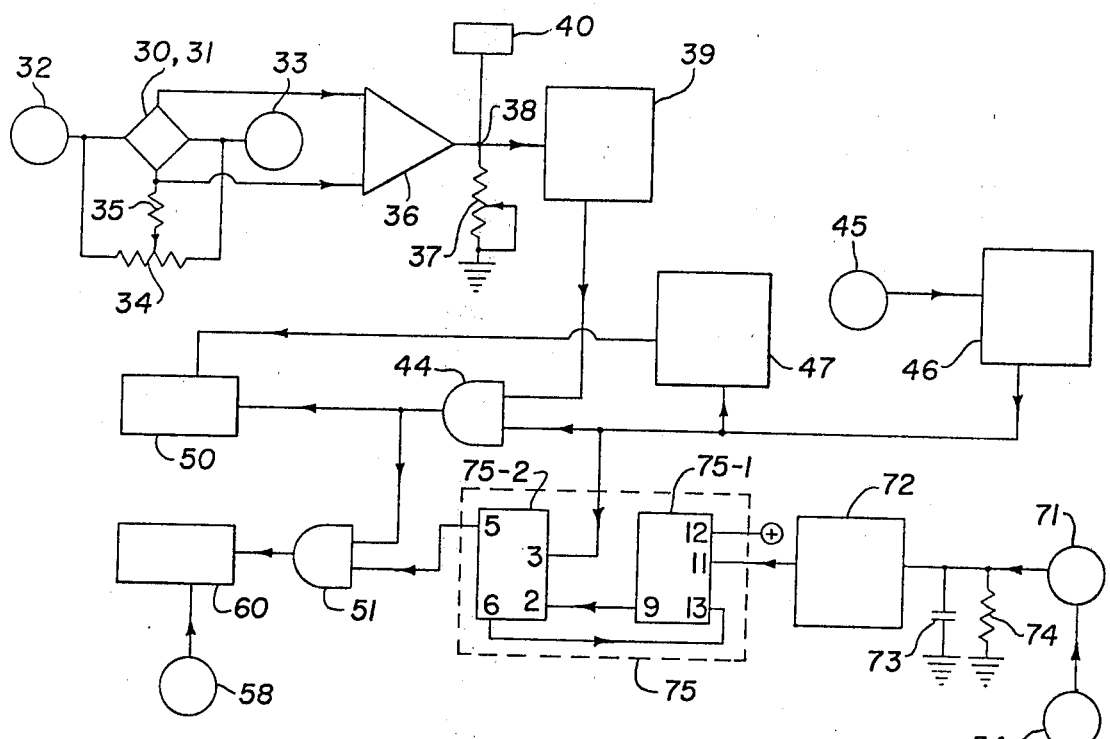
FIG. 4 is a block diagrammed alternative circuit arrangement for the weight measuring and accumulating system.

FIG. 4 is a modified control circuit in which a number of components are identical to those illustrated in FIG. 3 and bear the same reference number. This form of control circuit is preferred in the sense that, for adding the bucket load into the accumulator counter 60, the operator can close the add switch 54 without regard to the timing of the output pulse from the clock 46; in other words, the outputs from the add switch 54 and the clock 46 need not be simultaneous. Another advantage is that a limit switch and coacting triggering device may be mounted on the apparatus in association with the alignment pointers 21 and 22 respectively, so that the determination of the "weigh position" will be automatic.

In this modified circuit a limit switch 71 is shown in series with the add switch 54. The circuit will function with or without the limit switch; and the limit switch is an added feature the operation of which will be described in detail below. The output from the limit switch 71 and/or the add switch 54 is fed to a one-shot 72 which may produce an output pulse of short duration such as a small fraction of a second. A capacitor 73 and resistor 74 are connected between the input to the one-shot 72 and ground, to eliminate any false "add signals" which might otherwise be produced due to vibration or noisy switch contacts.

The output of one-shot 72 is fed to a flip-flop latch circuit 75 consisting of two D-type, positive edge triggered flip-flops 75-1 and 75-2. D input 12 is connected to positive voltage; and when the input 11 is pulsed by the one-shot 72 the flip-flop 75-1 is turned on to produce an output at 9 connected to the D input 2 of the flip-flop 75-2. Flip-flop 75-2 is then conditioned to turn on, and will turn on when the next ½ second pulse from the clock 46 is sensed at input 3. This produces an output at 5, which is the input to the AND gate 51 allowing the pulses from the converter 39 to pass to the accumulator counter 60. Simultaneously the flip-flop 75-2 produces a low or ground signal at output 6 to ground the "clear input 13" thereby turning off the flip-flop 75-1 and the output 9. This removes D input 2 which conditions flip-flop 75-2 to turn off when the next succeeding ½ second clock pulse is sensed at input 3, thereby turning off output 5.

The operation of this overall circuit in FIG. 4 is generally the same as that of the circuit of FIG. 3. For a circuit without the limit switch 71, the operator merely closes the add switch 54 when the alignment pointers 21 and 22 are approximately aligned; and at the beginning of the next clock pulse the flip-flop circuit 75 will be turned on to produce the input signal to the gate 51 as just described to enter the load count in the accumulator counter 60.

Where a limit switch 71 is included in the circuit, the operator will close the add switch 54 as the arm pointer 22 approaches the frame pointer 21; and when the limit switch 71, mounted on the frame pointer 21 for example, is closed by a trigger device mounted on the arm pointer 22 for example, the one-shot 72 will be energized to turn on the flip-flop circuit 75 as above described. The operator must hold the add switch 54 closed while the limit switch is closed by the movement of the bucket arms. With this arrangement, the operator need not stop the movement of the bucket, since the circuit will automatically record the bucket load as the arms move through the weigh position.

The following is an identification of several of the circuit components included in the circuits of FIGS. 3 and 4:

36—4051 Constant Current Amplifier
39—7500 Analog/Frequency Converter
44, 51, 53—7408 AND Gate
47, 52, 72—74121 One-Shot
75—7474 Dual Flip-Flop

WEIGHING METHOD

For use with a loading vehicle having a hydraulic lift cylinder for elevating a load carrier or bucket, a method for weighing bulk materials while transferring the bulk materials from one location to another such as onto a loading vehicle consists, in its more detailed form, of the following steps: detecting the instantaneous hydraulic pressure in the vehicle lift cylinder, which pressure is a function of the weight of the carrier and of its load; converting that instantaneous cylinder pressure into an analog signal such as an electric DC voltage signal which is proportional to the instantaneous pressure; passing that analog signal to a bridge circuit which includes an adjusting circuit for adjusting the bridge output to represent only the weight of the carrier load, eliminating the portion of the signal which represents the weight of the carrier itself; amplifying the output of the bridge circuit to a level suitable for further use; converting the adjusted electric analog signal to a frequency signal which consists of pulses generated at a frequency proportional to the adjusted analog signal; passing the frequency signal to a first pulse counter, through a first control gate means during a significant time interval, for counting and displaying the pulses representing the carrier load; passing said frequency signal to a second counter through said first control gate means and through a second control gate means; and passing a control signal to said second control gate means to effect the counting and displaying of pulses on said second counter once for each carrier load, whereby the display of said second counter represents the accumulation of successive carrier loads.

What has been described is a unique weighing and weight accumulation system which may be conveniently installed on either new or existing loading machines for determining instantaneously the weight of the load in the machine bucket or carrier, and which will also accumulate the weights of successive bucket loads which are loaded onto a transport vehicle. A particular feature and advantage of this system is that it is very easy to use by the operators of the loading machines, and that it should result in much more efficient operation of and use of such loading machines therefore being of substantial benefit to the operating enterprise.

An important advantage of the system is that it is simple and rugged, which it needs to be for use on loading machines of this type, and that it has a high degree of accuracy in regard to the loading of transport vehicles thereby utilizing these transport vehicles to their maximum capacity and minimizing the possibility of overload and the high cost penalties that go with overload.

Another advantage of the system is that it is versatile and can be adapted for use with many types of loading machines.

Also described is a unique method for weighing bulk materials while they are being transferred from one location to another by means of a loading vehicle as described. This unique method provides many of the advantages which are referred to with respect to the system. A particular advantage is that it provides a very accurate weight measurement of the materials being transferred.

While the preferred embodiment of the invention has been illustrated and described, it will be understood by those skilled in the art that changes and modifications may be resorted to without departing from the spirit and scope of the invention.

What is claimed is:

1. A system for measuring and indicating the weight of a load including; a load supporting means; weighing means comprising transducer means operatively connected to said load supporting means for producing an instantaneous electric analog signal proportional to the supported weight; converter means coupled to the output of said transducer means for converting said analog signal to a frequency signal consisting of pulses generated at a frequency proportional to said analog signal; characterized by a counter for counting and displaying output pulses from said converter;
   gate means coupling said counter to said converter means, for controlling the passing of converter output pulses to said counter;
   clock means coupled to said gate means for providing periodic gate-open intervals of preselected uniform time, whereby the passed pulses are representative of the supported load;
   and actuator means coupled to said gate means for initiating a single gate-open interval, whereby said counter functions as an accumulator counter for successive supported loads responsive to successive operations of said actuator means.

2. A system as set forth in claim 1 characterized by said actuator means comprising an add switch providing a second input to said gate means.

3. A system as set forth in claim 1 characterized by reset switch means associated with said counter to enable removal of an accumulated count of the converter output pulses.

4. A system as set forth in claim 3 characterized by a second counter functioning as a unit counter;
   a first AND gate coupling the output of said converter means to said unit counter;
   said first named counter functioning as an accumulator counter; a second AND gate coupling said accumulator counter to the output of said first AND gate; said first and second AND gates comprising said first named gate means;
   said clock means being coupled to said first AND gate for opening said gate for said periodic gate-open interval;
   said unit counter having automatic reset means, whereby said counter counts and displays the converter output pulses for each gate-open interval of said first AND gate, representing the extant supported load.

5. A system as set forth in claim 4 characterized by said actuator means comprising an add switch, and a third AND gate coupling said add switch to said second AND gate; and said clock means being coupled to said third AND gate as one input thereof, to synchronize the gate-open intervals of said first and second AND gates.

6. A system as set forth in claim 4 characterized by a one shot coupling said clock means to said counter automatic reset means, to produce a reset pulse at the initiation of each gate-open interval.

7. A system as set forth in claim 4 characterized by said actuator means comprising an add switch, a third AND gate and a one shot; said one shot coupling said second and third AND gates, producing an input pulse to said second AND gate having a duration at least as long as said gate-open interval of said first AND gate; said add switch and said clock means providing inputs to said third AND gate, said clock input synchronizing the gate-open interval of said first and second AND gates.

8. A system as set forth in claim 4 characterized by said actuator means including:
a flip-flop latch circuit the output of which is coupled to said second AND gate, an add switch for producing one input to said latch circuit, and said clock means beings coupled to said latch circuit for producing a second input to said latch circuit, thereby producing a latch circuit output to said second AND gate.

9. A system as set forth in claim 8 characterized by a one shot coupling said add switch to said latch circuit.

10. A method for measuring and indicating the weight of a load supported on a load supporting means characterized by the steps
detecting the load by means of a transducer means operatively connected to said load supporting means, the output of which is an electric analog signal proportional to the supported load;
converting said analog signal to a frequency signal consisting of pulses generated at a frequency proportional to said analog signal; and generating said frequency signal as a continuous signal;
passing the pulses of said frequency signal to a counter, intermittently during intervals of preselected uniform time, to count pulses representing the supported load.
storing the counted pulses in an accumulator counter, whereby the pulses representing successive supported loads are accumulated to indicate an accumulated load.

11. A method as set forth in claim 10 characterized by the step
controlling said accumulator counter to count said pulses during only one preselected time interval for each of successive supported loads, whereby said accumulator counter accumulates the count of pulses representing an accumulation of said successive supported loads.

12. A method as set forth in claim 11 characterized by the steps
passing said pulses of said frequency signal to an automatically resettable unit counter, whereby said unit counter counts the pulses passed during each of said time intervals, each of said counts representing the supported load;
and passing said pulses to said accumulator counter during only one of said time intervals for each successive supported load.

* * * * *